UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

THERAPEUTIC PREPARATION.

1,170,056.     Specification of Letters Patent.     Patented Feb. 1, 1916.

No Drawing.     Application filed January 30, 1913. Serial No 745,175.

*To all whom it may concern:*

Be it known that I, MAX ENGELMANN, doctor of philosophy, chemist, citizen of the German Empire, residing at Elberfeld, Germany, have invented new and useful Improvements in Therapeutic Preparations, of which the following is a specification.

My present invention concerns the production of a therapeutically valuable product being clay or kaolin impregnated with a difficultly soluble or insoluble silver compound. The product shows a strong disinfecting power and is non-irritant retaining the valuable properties of clay (bolus alba) *i. e.* its bland and protective action and its favorable effect upon wounds on account of its drying-up properties.

In order to illustrate the new process more fully the following example is given, the parts being by weight:—200 parts of white clay are introduced into a solution of 120 parts of silver nitrate in 2500 parts of a 30 per cent. alcohol and are well mixed with the liquid. After part of the liquid is removed by filtration the resulting product is dried and powdered. Subsequently it is introduced into a highly diluted aqueous solution of 100 parts of sodium phosphate, well stirred with the solution, until the insoluble or difficultly soluble silver phosphate has been formed, whereby the particles of clay held in suspension have deposited thereon small portions or particles of silver phosphate, removed from the liquid, dried and pulverized. The resulting clay contains from 1½ to 2 per cent. of silver.

The clay or kaolin impregnated with the insoluble or difficultly soluble silver compound (*e. g.* silver phosphate) is not itself physically changed to any appreciable degree, but nevertheless its action is materially altered. If kaolin or clay be used by itself it is difficult or impossible to sterilize it and as a result it frequently causes bad after-effects, many cases of tetanus being due to its use. Mixtures of the clay or kaolin with nitrate of silver, potassium permanganate, etc., have heretofore been proposed, but such mixtures, while more sterile than the clay itself, are nevertheless too irritating when used in medicine. The product of the present invention contains the clay most intimately incorporated with the silver compound and intimately coated by it. This product is sterile and does not cause any irritation. The clay or kaolin still retains its absorbent power, and the disinfecting effect of the insoluble salt precipitated on it is many times greater than the disinfecting effect of the same amount of the insoluble salt by itself. The insoluble salt thus sterilizes and improves the clay in its action while the valuable properties of the clay are retained and the clay itself acts as a carrier for the insoluble salt and increases its therapeutic action to a marked degree.

I claim:—

The new product comprising clay containing silver phosphate precipitated thereon and throughout its mass whereby said silver phosphate is deposited on and distributed over the surface of numerous small particles of clay and the active surface of the silver phosphate thereby greatly extended, said product retaining the bland, protective and drying-up properties of the clay and possessing a strong disinfecting action, substantially as described.

In testimony whereof I have hereunto set my hand in the presence of two subscribing witnesses.

MAX ENGELMANN. [L. S.]

Witnesses:
    HELEN NUFER,
    ALBERT NUFER.